United States Patent [19]

Zenker

[11] 4,422,203

[45] Dec. 27, 1983

[54] PLASTIC MOP HOLDER

[75] Inventor: Franz R. Zenker, Johnstown, N.Y.

[73] Assignee: White Mop Wringer Company, Fultonville, N.Y.

[21] Appl. No.: 396,599

[22] Filed: Jul. 9, 1982

[51] Int. Cl.³ .......................................... A47L 13/258
[52] U.S. Cl. ...................................... 15/150; 15/151; 15/153; 403/234
[58] Field of Search ................. 15/228, 229 A, 147 C, 15/149, 150, 151, 153; 403/234

[56] References Cited

U.S. PATENT DOCUMENTS

| | | | |
|---|---|---|---|
| 1,267,398 | 5/1918 | Gavin . | |
| 1,401,051 | 12/1921 | Dalton . | |
| 1,475,479 | 11/1923 | Feth . | |
| 1,535,767 | 4/1925 | Cunningham | 15/150 |
| 1,551,804 | 9/1925 | Dalton . | |
| 1,611,033 | 12/1926 | Hill et al. . | |
| 1,748,842 | 2/1930 | Klonaris | 15/152 |
| 1,849,147 | 3/1932 | Labant . | |
| 1,968,622 | 7/1934 | Smith | 15/153 |
| 2,065,407 | 12/1936 | Steuernagel | 15/151 |
| 2,431,564 | 11/1947 | Jumonville | 15/153 |
| 2,584,729 | 2/1952 | Nezamis | 15/153 |
| 2,692,403 | 10/1954 | Friar | 15/153 |
| 2,712,144 | 7/1955 | Dunn | 15/151 |
| 2,724,852 | 11/1955 | Clark | 15/152 |
| 2,807,819 | 10/1957 | Healy | 15/153 |
| 2,900,652 | 8/1959 | Kautenberg | 15/153 |
| 3,187,363 | 6/1965 | Auwarter | 15/229 |
| 3,398,420 | 8/1968 | Manning | 15/150 |
| 3,457,581 | 7/1969 | Oas | 15/147 |
| 3,544,173 | 12/1970 | Senick et al. | 403/234 |
| 4,287,632 | 9/1981 | Hammond | 15/150 |

OTHER PUBLICATIONS

"White Floor Mopping Equipment and Mipro Waste Receptacles List Prices effective Jan. 1, 1981", White Mop Wringer Company, Fultonville, New York, Jan. 1, 1981.

"New 'Plastic' #95", White Mop Wringer Company, Fultonville, New York, Nov. 1, 1980.

*Primary Examiner*—Chris K. Moore
*Attorney, Agent, or Firm*—Robert R. Jackson; Robert C. Morgan

[57] ABSTRACT

A holder for a string-type or similar mop head. The holder is preferably made entirely of plastic and comprises a yoke, a mop head support member connecting the free ends of the arms of the yoke, and a mop head clamping assembly reciprocally mounted inside the yoke for clamping a mop head against the support member. The mop holder is opened for insertion or removal of a mop head by shifting the support member longitudinally to unlatch it and then rotating the support member out of the plane defined by the arms of the yoke.

5 Claims, 8 Drawing Figures

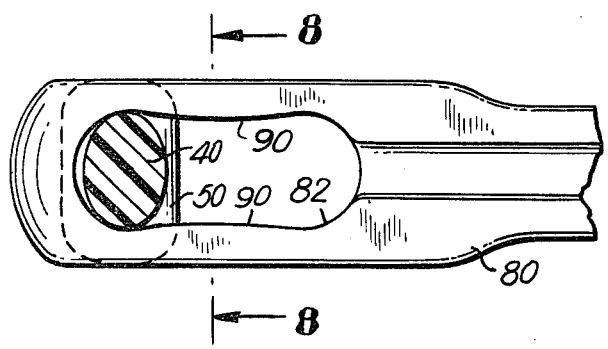
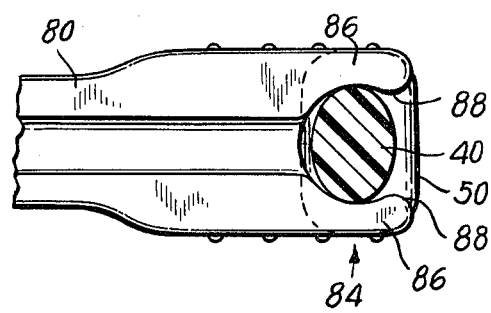
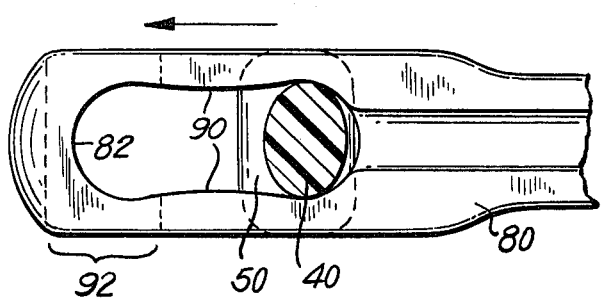
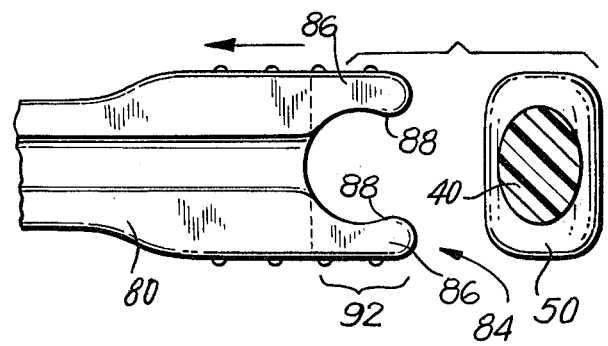
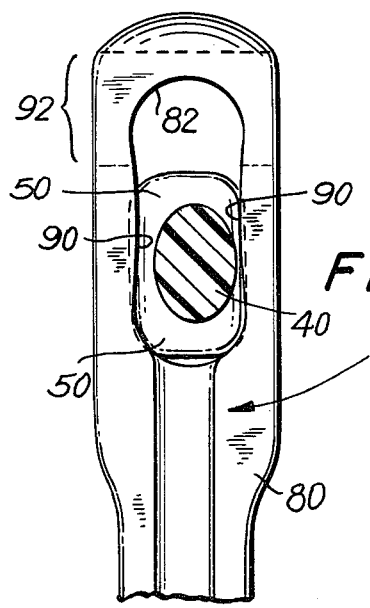
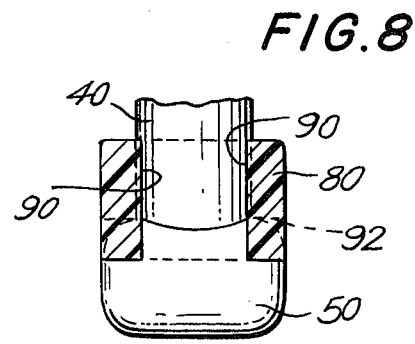

PLASTIC MOP HOLDER

BACKGROUND OF THE INVENTION

This invention relates to mop holders, and more particularly to plastic holders for string-type mop heads which facilitate easy and rapid replacement of the mop head.

Mop holders made of metal have been known for many years. (See, for example, Kautenberg U.S. Pat. No. 2,900,652). Today, however, there is increasing interest in using plastic materials, rather than metal, for mop holders. Among the reasons for preferring plastic are lower cost, easier fabrication, better appearance, greater resistance to deterioration, and reduced risk of injury to the user or damage to other objects.

To be useful, a mop holder should be easy to assemble and disassemble. It should also be sturdy in use and should facilitate periodic removal and replacement of the mop head. When a dirty or worn mop head is to be removed, it is desirable that the holder permit removal of the mop head without requiring the user to handle the mop head extensively because contact with the mop head may be distasteful and unsanitary.

In view of the foregoing, it is an object of this invention to provide a plastic mop holder which is easy to assemble, sturdy in use, and simple and easy to operate to change mop heads.

It is another object of this invention to provide a plastic mop holder which permits removal of the mop head from the holder without substantial handling of the mop head by the user.

SUMMARY OF THE INVENTION

These and other objects of the invention are accomplished in accordance with the principles of the invention by providing a plastic mop holder having a yoke, a mop head support member pivotally mounted near the free end of one of the arms of the yoke and being extendable between the free ends of both arms of the yoke, and means mounted on the yoke for releasably clamping a mop head against the mop head support member. The pivotal axis of the mop head support member is the longitudinal axis of the yoke arm on which the support member is pivotally mounted. A mop head is removed from the mop holder by releasing the clamping means, retracting the mop head support member from contact with the yoke arm about which the mop head does not pivot, pivoting the mop head support member about the other yoke arm, and removing the mop head from the mop head support member. This procedure is reversed to place a new mop head in the holder. The mop head support member can be completely removed from the yoke if desired while the support member is pivoted out of the plane defined by the arms of the yoke.

Further features of the invention, its nature and various advantages will be more apparent from the accompanying drawing and the following detailed description.

BRIEF DESCRIPTION OF THE DRAWING

FIGS. 3 and 4 are cross sectional views taken along the lines 3—3 and 4—4, respectively, in FIG. 2.

FIGS. 5 and 6 are views similar to FIGS. 3 and 4, respectively, but showing the mop head support member in the retracted position.

FIG. 7 is a view similar to FIG. 5 but showing the mop head support member pivoted out of the plane of the yoke of the mop holder.

FIG. 8 is a cross sectional view taken along the line 8—8 in FIG. 3.

DETAILED DESCRIPTION OF THE INVENTION

Figure 1:
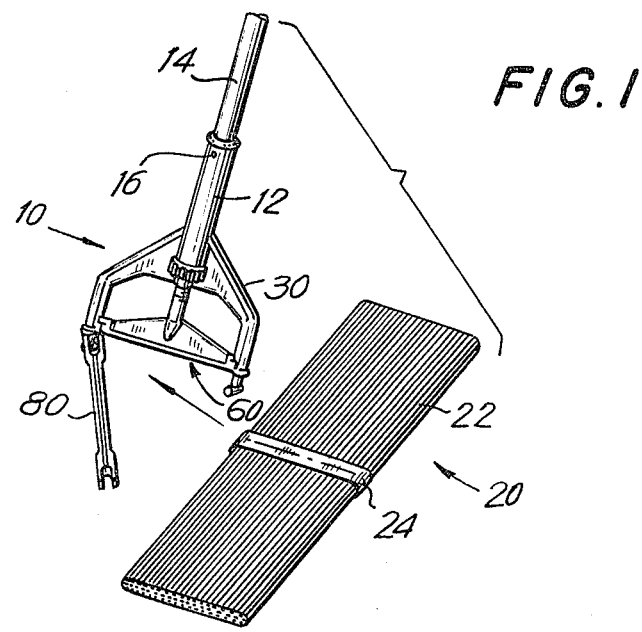
FIG. 1 is a perspective view of the mop holder of this invention in condition to receive a mop head.

As shown in FIG. 1, the plastic mop holder 10 of this invention includes a tubular shank 12 for receiving the end of a conventional mop stick or handle 14 of wood, plastic, metal, or any other suitable material. Mop holder 10 is secured to mop handle 14 by rivet 16. Mop holder 10 is designed to receive and hold mop head 20. Illustratively, mop head 20 is a string-type mop head including a plurality of parallel strings 22 bound together at their midpoints by transverse fabric tape 24.

Figure 2:
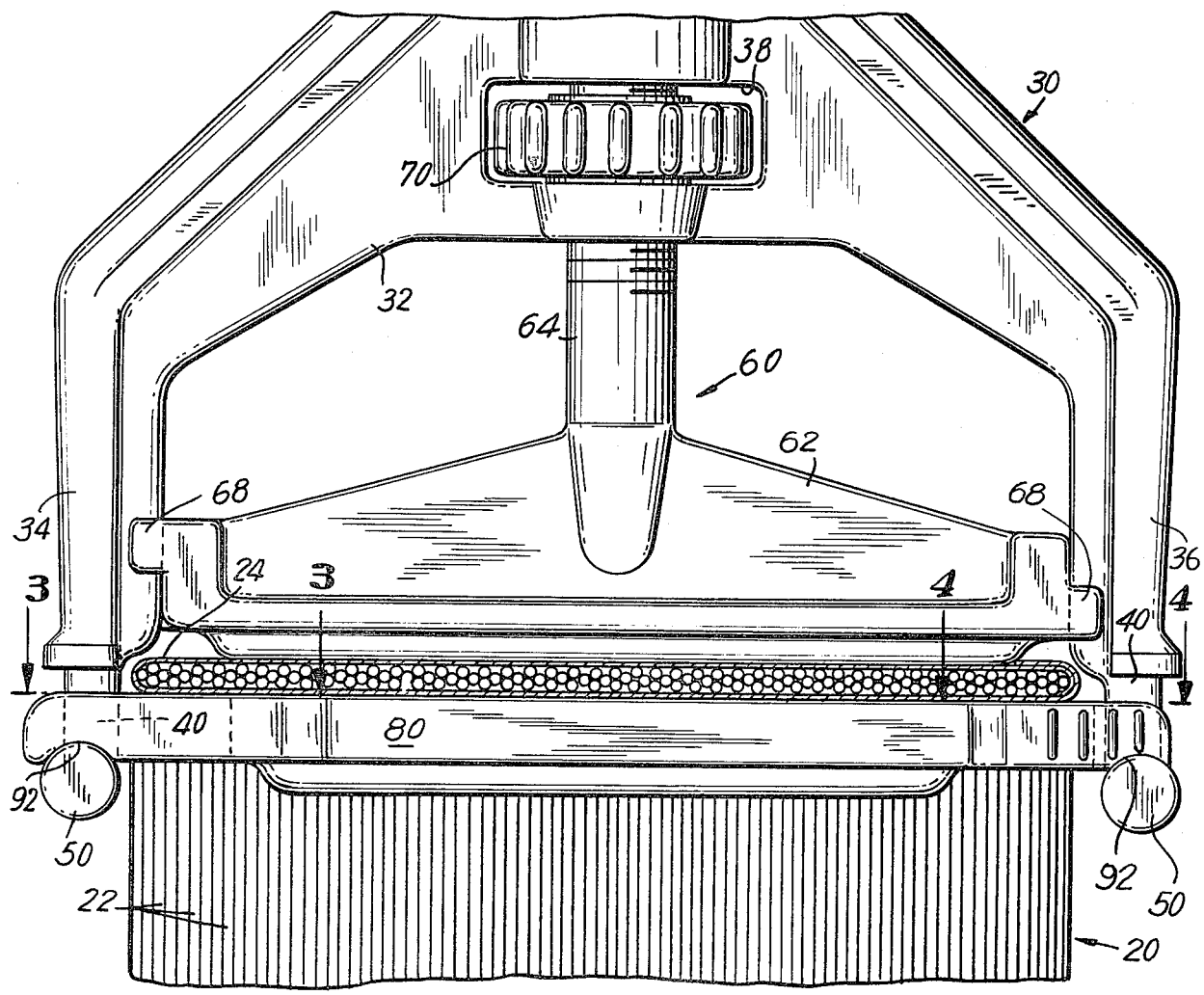
FIG. 2 is an elevational view of the mop holder of this invention with a mop head clamped in the holder. The mop head itself is partly in section in FIG. 2.

Integral with shank 12 at the distal end of the shank is a yoke 30 including base 32 and two distally extending, laterally spaced, substantially parallel arms 34 and 36 (see FIG. 2). Elements 32, 34, and 36 lie in a plane which is referred to for convenience herein as the yoke plane of the mop holder. Each of arms 34, 36 has a proximal mounted end portion by which it is secured to base 32, and an opposite, distal, free end portion. The free end portion of each arm includes a post 40 aligned with arms 34, 36 and having a substantially oval cross section (see FIGS. 3 and 4). Each post terminates at the free end of the associated yoke arm in a retention member 50. Each retention member is a circular cylinder having a longitudinal axis substantially perpendicular to the yoke plane and extending longitudinally on both sides of the associated post 40.

All of the parts of mop holder 10 described in detail above are preferably integral (one piece).

Between arms 34 and 36 is the head 62 of a mop clamp assembly 60 which includes a threaded shaft 64 concentric with shank 12 and a threaded nut 70 disposed in aperture 38 in yoke base 32. Shaft 64 is free to reciprocate longitudinally relative to yoke 30 and is threadedly engaged with nut 70. The knurled outer surface of at least a portion of nut 70 is accessible to the user of the apparatus on each side of yoke 30. Rotation of nut 70 causes mop clamp head 62 to move in either the distal or proximal direction along arms 34, 36, depending on the direction of rotation of the nut. Mop clamp head 62 is maintained parallel to the yoke plane by projections 68 which overlap portions of arms 34, 36.

Extending between the posts 40 on arms 34, 36 is mop support member 80. As best seen in FIGS. 3–8, support member 80 has an aperture 82 near one end and a bifurcated structure or yoke 84 at the other end. Aperture 82 surrounds post 40 on arm 34, while the two arms 86 of yoke 84 fit around post 40 on arm 36. The retention members 50 on the ends of arms 34, 36 normally prevent support member 80 from slipping off the end of yoke 30. Mop head 20 is held in place in the mop holder by rotating nut 70 until the mop head is clamped (at tape 24) between head 62 and support member 80 as shown in FIG. 2.

The normal position of support member 80 is shown in FIGS. 2–4. This is the position support member 80 must assume in order to cooperate with head 62 to clamp a mop head in holder 10. As best seen in FIG. 3, when support member 80 is in this position, the post 40 in aperture 82 is at the end of the aperture which is most remote from yoke 84 at the other end of the support member. Aperture 82 extends from post 40 in the direction of yoke 84 by a distance sufficient to allow the arms 86 of yoke 84 to clear the associated post 40 (see FIG. 6) when the user shifts support member 80 so that the post 40 in aperture 82 is at the end of the aperture closest to yoke 84 (see FIG. 5). Support member 80 can be shifted in this manner when head 62 is retracted to release the clamping pressure on the mop head. Inwardly projecting portions 88 of arms 86, and central inwardly projecting portions 90 of aperture 82 respectively cooperate with posts 40 to provide interfitting detents or latches to releasably resist shifting of the support member from the position shown in FIGS. 2–4 to the position shown in FIGS. 5 and 6. Such detents are easily formed and easily operated because all parts of mop holder 10 are plastic.

The end portions 92 of support member 80 are recessed to receive the adjacent surfaces of retention members 50 when support member 80 is in the normal position described above. In this way support member 80 seats in the normal position so that it cannot be inadvertently dislodged while a mop head is clamped in the holder.

When support member 80 is shifted to the position shown in FIGS. 5 and 6, support member 80 is free to rotate 360° about the post 40 which passes through aperture 82. This rotation of support member 80 occurs in a plane substantially perpendicular to the yoke plane. FIG. 7, for example, shows support member 80 rotated approximately 90° from the position shown in FIGS. 5 and 6. In this position (or any other position in which the yoke end 84 of support member 80 is not adjacent arm 36) an old worn or dirty mop head can be easily shaken off support member 80 and a new mop head can be placed on head 62 between arms 34, 36. The support member can then be repositioned between arms 34 and 36 in the yoke plane and then shifted back to the position shown in FIGS. 3 and 4. The new mop head is clamped in the holder by operating nut 70 to extend head 62 toward support member 80.

Because post 40 has an oval cross sectional shape with the major axis perpendicular to the yoke plane, the interfitting detent relationship between aperture surfaces 90 and post 40 only occurs while support member 80 is substantially parallel to the yoke plane. When support member 80 is rotated substantially perpendicular to the yoke plane as shown in FIG. 7, the support member can be moved so that post 40 is located anywhere in apeture 82 with no detent action or other interference between the support member aperture and the post.

If necessary or desired, support member 80 can be removed completely from holder 10 by rotating the support member perpendicular to the yoke plane. Elongated support member aperture 82 is then aligned with the longitudinal axis of retention member 50. Aperture 82 is longer than retention member 50, but the inwardly projecting portions 90 of the sides of aperture 82 continue to cooperate with retention member 50 to provide an interfitting detent for releasably resisting removal of support member 80. Thus support member 80 is held on the remainder of holder 10 unless rotated to a particular position and then deliberately forced over retention member 50.

It should be noted that while support member 80 is off the remainder of mop holder 10, the other parts of the mop holder can also be completely disassembled. Thus head 62 can be extended by rotation of nut 70 until shaft 64 is completely disengaged from the nut. The piece consisting of head 62 and shaft 64 can then be completely pulled out of yoke 30. Nut 70 is then also free to drop out of aperture 38. The holder is assembled (or reassembled) by the reverse of the foregoing operations.

For simplicity of construction and operation, arms 34 and 36 are preferably mirror images of one another about an intermediate plane which is perpendicular to the yoke plane and parallel to the arms. In this way support member aperture 82 can be placed on the post 40 of either arm and support member yoke 84 can likewise be engaged with the post 40 of either arm.

Although several conventional plastic materials are suitable for use in making mop holder 10, a particularly preferred material is conventional, commercially available talc filled polypropylene. The several parts of the mop holder can be conveniently fabricated using conventional injection molding techniques.

It will be understood that the foregoing is merely illustrative of the principles of the invention and that various modifications can be made by those skilled in the art without departing from the scope and spirit of the invention. For example, except for the provision of the features mentioned specifically above, support member 80 may have any of a wide variety of cross sectional shapes.

I claim:

1. A plastic holder for a mop head comprising:
  a first yoke having a base and two laterally spaced, substantially parallel longitudinal arms, each arm having a free end portion and a mounted end portion, the mounted end portions of the arms being connected together by the base, and the free end portion of each arm including a longitudinally extending post terminating at the free end of the arm in a retention member extending transversely to the yoke plane defined by the longitudinal axes of the arms;
  a mop head support member pivotally mounted on the yoke so as to extend between the posts, one end portion of the support member defining an aperture through which the adjacent post passes, the other end portion of the support member defining a second yoke between the arms of which the adjacent post passes, parts of the end portions of the support member contacting the retention members to prevent the support member from slipping off the free ends of the arms of the first yoke when the posts are respectively disposed in the aperture and between the arms of the second yoke, the aperture and associated post cooperating to allow the support member to be moved longitudinally in the yoke plane to retract the second yoke from the associated post and to thereafter allow the support member to be pivoted at least 180° about the post passing through the aperture; and
  means mounted on the yoke for releasably clamping a mop head against the support member.

2. The apparatus defined in claim 1 wherein at least one of the posts and the associated end portion of the support means cooperate to provide a first detent to releasably resist longitudinal motion of the support member in the yoke plane.

3. The apparatus defined in claim 1 wherein the retention member on the arm of the first yoke associated with the aperture can pass through the aperture to permit removal of the support member from the first yoke only when the support member is pivoted out of the yoke plane.

4. The apparatus defined in claim 3 wherein the retention member and the associated aperture cooperate to provide a second detent to releasably resist removal of the support member from the first yoke when the support member is pivoted out of the yoke plane.

5. The apparatus defined in claim 3 wherein the arms of the first yoke are mirror images of one another about a mirror plane perpendicular to the yoke plane and parallel to the longitudinal axes of the arms so that the support member can be placed on the first yoke with the aperture around either post.

* * * * *